(12) United States Patent
Joshi et al.

(10) Patent No.: US 8,547,828 B2
(45) Date of Patent: Oct. 1, 2013

(54) METHOD AND SYSTEM FOR IMPLEMENTING NETWORK ELEMENT-LEVEL REDUNDANCY

(75) Inventors: Mandar Joshi, Santa Clara, CA (US); Pasula Srinivasa Reddy, Santa Clara, CA (US)

(73) Assignee: Fujitsu Limited, Kawasaki-shi (JP)

( * ) Notice: Subject to any disclaimer, the term of this patent is extended or adjusted under 35 U.S.C. 154(b) by 412 days.

(21) Appl. No.: 12/849,311

(22) Filed: Aug. 3, 2010

(65) Prior Publication Data

US 2012/0033547 A1 Feb. 9, 2012

(51) Int. Cl.
*G06F 11/00* (2006.01)

(52) U.S. Cl.
USPC ............... 370/217; 370/221; 370/225; 398/2

(58) Field of Classification Search
None
See application file for complete search history.

(56) References Cited

U.S. PATENT DOCUMENTS

| | | | | |
|---|---|---|---|---|
| 6,775,228 B1 * | 8/2004 | Solana De Quesada | ...... | 370/217 |
| 8,218,434 B1 * | 7/2012 | Brown et al. | ................. | 370/227 |
| 2007/0264008 A1 * | 11/2007 | Zaacks et al. | ..................... | 398/3 |
| 2009/0142060 A1 * | 6/2009 | Strasser et al. | ................... | 398/68 |

OTHER PUBLICATIONS

Joshi et al.; U.S. Appl. No. 12/849,268; "Method and system for implementing network element-level redundancy"; pp. 35, filed Aug. 3, 2010.
Joshi et al.; U.S. Appl. No. 12/849,289; "Method and system for implementing network element-level redundancy"; pp. 37, filed Aug. 3, 2010.
Joshi et al.; U.S. Appl. No. 12/849,329; "Method and system for implementing network element-level redundancy"; pp. 37, filed Aug. 3, 2010.
Final Office Action; U.S. Appl. No. 12/849,289; pp. 20, Dec. 13, 2012.
Final Office Action; U.S. Appl. No. 12/849,311; pp. 15, Feb. 26, 2013.
Final Office Action; U.S. Appl. No. 12/849,311; pp. 20, Dec. 12, 2012.

* cited by examiner

*Primary Examiner* — Chi Pham
*Assistant Examiner* — Shick Hom
(74) *Attorney, Agent, or Firm* — Baker Botts L.L.P.

(57) ABSTRACT

A first network element is coupled to a second network element via a first path of a first point-to-point network, the first network element is coupled to a third network element via a second path of the first-point-to-point network, the second network element is coupled to a fourth network element via a first path of a second point-to-point network, and the third network element is coupled to the fourth network element via a second path of the second point-to-point network. The paths of the first point-to-point network are configured as paths of a first linear protected switching connection and the paths of the second point-to-point network are configured as paths of a second linear protected switching connection such that traffic communicated between the first network element and the fourth network element via the first paths may be switched over to the second paths.

20 Claims, 4 Drawing Sheets

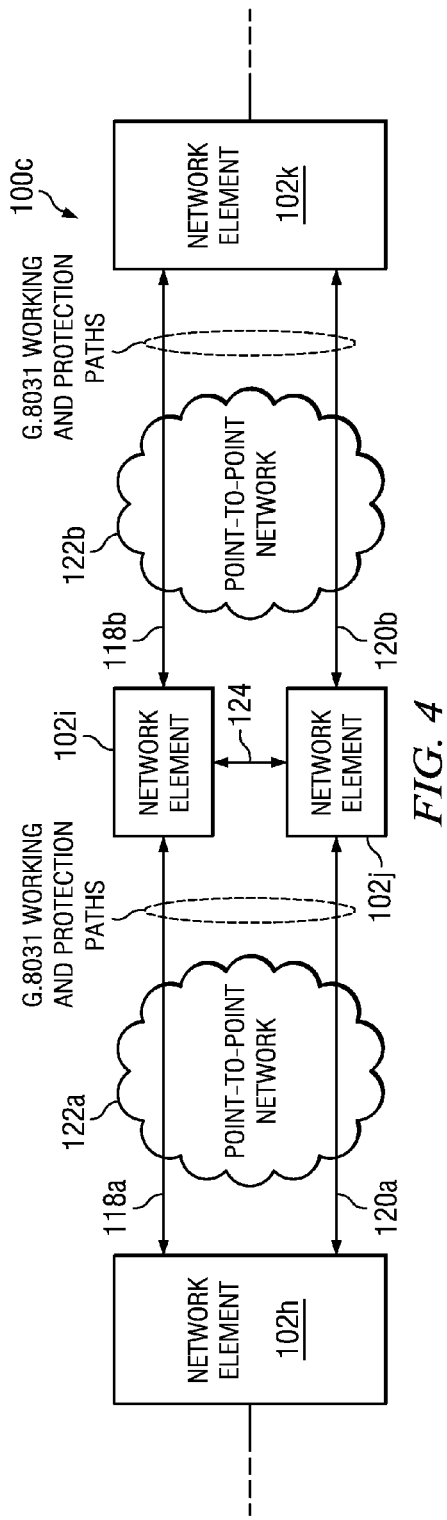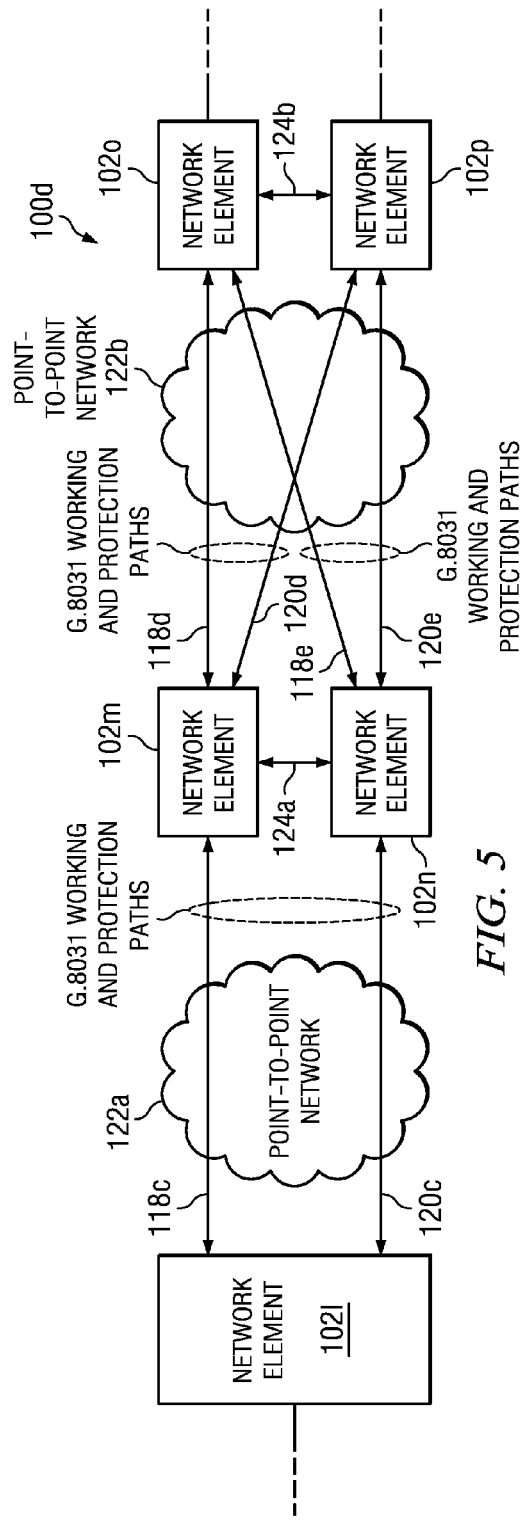

METHOD AND SYSTEM FOR IMPLEMENTING NETWORK ELEMENT-LEVEL REDUNDANCY

RELATED APPLICATION

This application is related to copending Patent Application entitled "Method and System for Implementing Network Element-Level Redundancy," application Ser. No. 12/849,269, filed on Aug. 3, 2010.

This application is also related to copending Patent Application entitled "Method and System for Implementing Network Element-Level Redundancy," application Ser. No. 12/849,289, filed on Aug. 3, 2010.

This application is also related to copending Patent Application entitled "Method and System for Implementing Network Element-Level Redundancy," application Ser. No. 12/849,329, filed on Aug. 3, 2010.

TECHNICAL FIELD OF THE DISCLOSURE

The present disclosure relates generally to networked communications and, more particularly, to a method and system for implementing network element-level redundancy.

BACKGROUND

In telecommunications, information is often sent, received, and processed according to the Open System Interconnection Reference Model (OSI Reference Model or OSI Model). In its most basic form, the OSI Model divides network architecture into seven layers which, from top to bottom, are the Application, Presentation, Session, Transport, Network, Data-Link, and Physical Layers, which are also known respectively as Layer 7 (L7), Layer 6 (L6), Layer 5 (L5), Layer 4 (L4), Layer 3 (L3), Layer 2 (L2), and Layer 1 (L1). It is therefore often referred to as the OSI Seven Layer Model.

Layer 2 is the layer which typically transfers data between adjacent network nodes in a wide area network or between nodes on the same local area network segment. Layer 2 provides the functional and procedural means to transfer data between network entities and might provide the means to detect and possibly correct errors that may occur in Layer 1. Examples of Layer 2 protocols are Ethernet for local area networks (multi-node), the Point-to-Point Protocol (PPP), HDLC and ADCCP for point-to-point (dual-node) connections. Layer 2 data transfer may be handled by devices known as switches.

To ensure high reliability and availability in communications networks, protection switching is often used. When implemented, protection switching typically provides a primary or "working" path for a network and a redundant or "protection" path for the network. Accordingly, each path may be monitored, and if a failure is detected on the working path, network traffic may be switched to the protection path. An example of protection switching may be Ethernet Linear Protection Switching (ELPS) as defined by the ITU G.8031 standard.

While protection switching may provide redundancy for link or path failures, it does not provide redundancy in the event of a failure of a network element (e.g., a switch) redundantly-interfaced to a point-to-point network. Accordingly, this disclosure provides for such network-element level redundancy.

SUMMARY

In accordance with the present disclosure, disadvantages and problems associated with creating redundancy in L2 networks may be reduced or eliminated.

According to one embodiment, a method may include communicatively coupling a first network element to a second network element via a first path of a point-to-point connection. The method may also include communicatively coupling the first network element to a third network element via a second path of the point-to-point network. The method may further include configuring the first path and the second path as paths of a linear protected switching connection (LPSC) such that traffic associated with a service and communicated via one of the first path and the second path may be switched over to the other of the first path and the second path in response to an event.

According to another embodiment, a method may include communicatively coupling a first network element to a second network element via a first link of a multi-chassis link aggregation group. The method may also include communicatively coupling the first network element to a third network element via a second link of the multi-chassis link aggregation group. The method may additionally include communicatively coupling the second network element to a fourth network element via a first path of a point-to-point network. The method may further include communicatively coupling the third network element to the fourth network element via a second path of the point-to-point network. The method may also include configuring the first path and the second path as paths of a linear protected switching connection such that traffic associated with a service and communicated between the first network element and the fourth network element via the first link and the first path may be switched over to the second link and the second path in response to an event.

According to an additional embodiment, a method may include communicatively coupling a first network element to a second network element via a first path of a first point-to-point network. The method may also include communicatively coupling the first network element to a third network element via a second path of the first-point-to-point network. The method may additionally include communicatively coupling the second network element to a fourth network element via a first path of a second point-to-point network. The method may further include communicatively coupling the third network element to the fourth network element via a second path of the second point-to-point network. The method may also include configuring the first path and the second path of the first point-to-point network as paths of a first linear protected switching connection and the first path and the second path of the second point-to-point network as paths of a second linear protected switching connection such that traffic associated with a service and communicated between the first network element and the fourth network element via the first path of the first point-to-point network and the first path of the second point-to-point network may be switched over to the second path of the first point-to-point network and the second path of the second point-to-point network in response to an event.

According to a further embodiment, a method may include communicatively coupling a first network element to a second network element via a first path of a point-to-point network. The method may also include communicatively coupling the first network element to a third network element via a second path of the point-to-point network. The method may additionally include communicatively coupling the second network element and the third network element to a multipoint-to-multipoint network. The method may further include configuring the first path and the second path as paths of a linear protected switching connection such that traffic associated with a service and communicated between the first network element and the multipoint-to-multipoint network via one of the first path and the second path may be switched over to the other of the first path and the second path in response to an event.

Certain embodiments of the disclosure may provide one or more technical advantages. A technical advantage may be that a network may provide network element-level redundancy for point-to-point Ethernet virtual channels across a network.

Certain embodiments of the disclosure may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure and its features and advantages, reference is now made to the following description, taken in conjunction with the accompanying drawings, in which:

FIG. 4 illustrates a block diagram of an example network including protection switching among multiple network elements interfaced between point-to-point network domains, in accordance with certain embodiments of the present disclosure;

FIG. 5 illustrates a block diagram of another example network including protection switching among multiple network elements interfaced between point-to-point network domains, in accordance with certain embodiments of the present disclosure.

DETAILED DESCRIPTION

Figure 1:
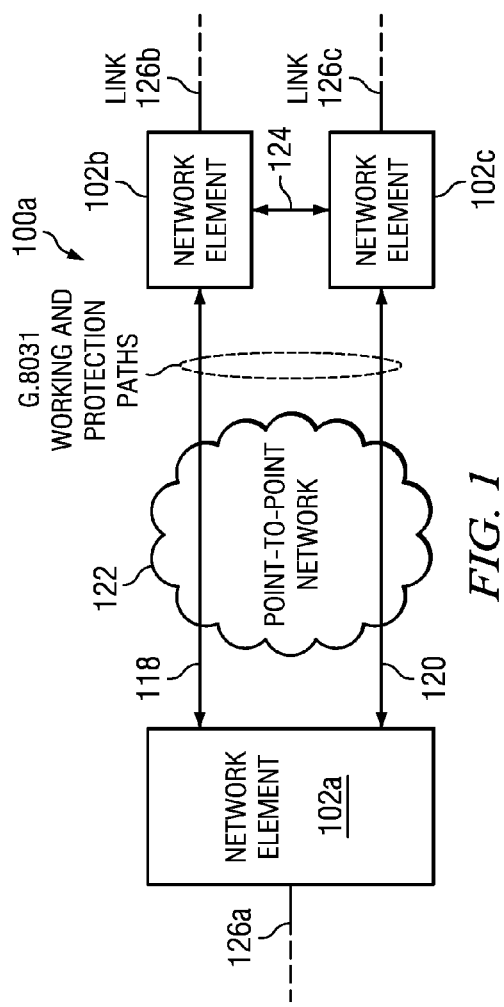
FIG. 1 illustrates a block diagram of an example network including protection switching among multiple network elements, in accordance with certain embodiments of the present disclosure.

FIG. 1 illustrates a block diagram of an example network 100a including protection switching among multiple network elements 102 (e.g., network elements 102b and 102c), in accordance with certain embodiments of the present disclosure. As shown in FIG. 1, network 100a may include network element 102a communicatively coupled to network element 102b and network element 102c via point-to-point network 122.

Each network element 102 (e.g., network elements 102a-102c) in network 100a and network elements 102 described in FIG. 3-6 (e.g., network elements 102d-102s of networks 100b-110e) may comprise any suitable system operable to transmit and receive traffic. As used herein, "traffic" means information transmitted, stored, or sorted in a network 100 (e.g., networks 100a-100e). Such traffic may comprise optical or electrical signals configured to encode audio, video, textual, and/or any other suitable data. The data may also be real-time or non-real-time. Traffic may be communicated via any suitable communications protocol, including, without limitation, the Open Systems Interconnection (OSI) standard and Internet Protocol (IP). Additionally, the traffic communicated in networks 100 may be structured in any appropriate manner including, but not limited to, being structured in frames, packets, or an unstructured bit stream. In the illustrated embodiment, each network element 102 may be operable to transmit traffic to one or more other network elements 102 and receive traffic from the one or more other network elements 102. Network elements 102 will be discussed in more detail below with respect to FIG. 2.

Point-to-point network 122 may be any network of one or more network elements (e.g., routers and switches) suitable to provide one or more point-to-point paths between network element 102a and network element 102b, and between network element 102a and network element 102c.

Network element 102a may communicate with network elements 102b and 102c using linear protected switching. Accordingly, network element 102a may be communicatively coupled to network elements 102b and 102c through a linearly protected switching connection. The linearly protected switching connection may comprise a working path 118 and a protection path 120. Network element 102a may be communicatively coupled to network element 102b via working path 118, and may be communicatively coupled to network element 102c via protection path 120. In certain embodiments, with respect to network element 102a, the linearly protected switching connection may be configured in accordance with the ITU G.8031 standard. In these and other embodiments, with respect to network elements 102b and 102c, the linear protected switching connection may be configured in connection with a modified multi-chassis version of the ITU G.8031 standard. In addition, network element 102a may be communicatively coupled to other network entities (e.g., other network elements) via link 126a, network element 102b may be communicatively coupled to other network entities via link 126b, and network element 102c may be communicatively coupled to other network entities via link 126c.

Network element 102a may be configured to perform linear protected switching between working path 118 and protection path 120. For example, network element 102a may be configured to perform protection switching between paths 118 and 120 in accordance with the G.8031 standard and may thus maintain a G.8031 state machine for maintaining state information and switchover information for protection switching. In certain embodiments, network element 102a may be multi-homed such that network elements 102b and 102c appear as a single network element to network element 102a.

In addition, network elements 102b and 102c may be configured to implement protection switching between working path 118 and protection path 120. For example, network elements 102b and 102c may be configured to perform protection switching between paths 118 and 120 in accordance with the G.8031 standard and each may thus maintain a G.8031 state machine for maintaining state information and switchover information for protection switching. In addition, network elements 102b and 102c may be communicatively coupled via a synchronization connection 124. Via synchronization connection 124, network elements 102b and 102c may communicate to each other such state information and switchover information. In certain embodiments, such communication via synchronization connection 124 may be in accordance with Inter-Control Center Communications Protocol (ICCP) or similar protocol. Synchronization connection 124 may include a direct link, a point-to-point connection over point-to-point network 122, a dedicated management network, or any other suitable type of connection. In these and other embodiments, synchronization connection 124 may include redundancy (e.g., multiple physical links between network elements 102b and 102c) to provide high reliability and availability of communication between network elements 102b and 102c.

In operation, paths 118 and 120 may provide connectivity for services between network element 102a and network elements 102b and 102c. For a particular service, one of paths 118, 120 may be designated as active, such that traffic for such service is communicated over such active path. In the event of a failure or other event, one or more of network elements 102a, 102b, and 102c may cause a protection switch of the service from the active path to the other path (e.g., from working path 118 to protection path 120). In certain embodiments, such protection switching may be implemented in accordance with the G.8031 standard.

In addition, during operation paths 118 and 120 may be configured in accordance with any suitable redundancy scheme. For example, a 1+1 protection scheme may be used in which traffic is replicated among paths 118 and 120 and an end point network element may determine which path to select. As another example, a 1:1 scheme may be used in which all traffic is communicated over a single path (e.g., working path 118) and is protection switched to the other (e.g., protection path 120) in response to an event.

Protection switching from one path to another may occur in response to any suitable event. For example, failure of a path 118, 120 may cause a switchover to the other path. As another example, failure of a link 126b or 126c or other event upstream of network elements 102b and/or 102c may cause a switchover (e.g., failure of link 126b may cause a switchover from working path 118 to protection path 120). As an additional example, a switchover may occur automatically after a failure condition has been remedied (e.g., a wait to restore timer initiated after a failure on working path 118 may trigger a switchover from protection path 120 to working path 118). As a further example, a switchover may occur in response to a human-initiated action (e.g., a command to switchover issued by a network operator/administrator). All such events may be monitored by network elements 102b and 102c and all such monitoring may be synchronized between network elements 102b and 102c via synchronization connection 124. In addition, switchovers may be initiated by network element 102b and/or network element 102c in response to such monitored events, and such initiation of such switchovers may also be synchronized between network elements 102b and 102c via synchronization connection 124.

A technical advantage of network 100a is that it provides for network element-level redundancy for point-to-point Ethernet virtual channels across a network. In addition, an access network element (e.g., network element 102a) need not be directly connected to network elements 102b and 102c, as would be the case with multiple chassis link aggregation.

Figure 2:
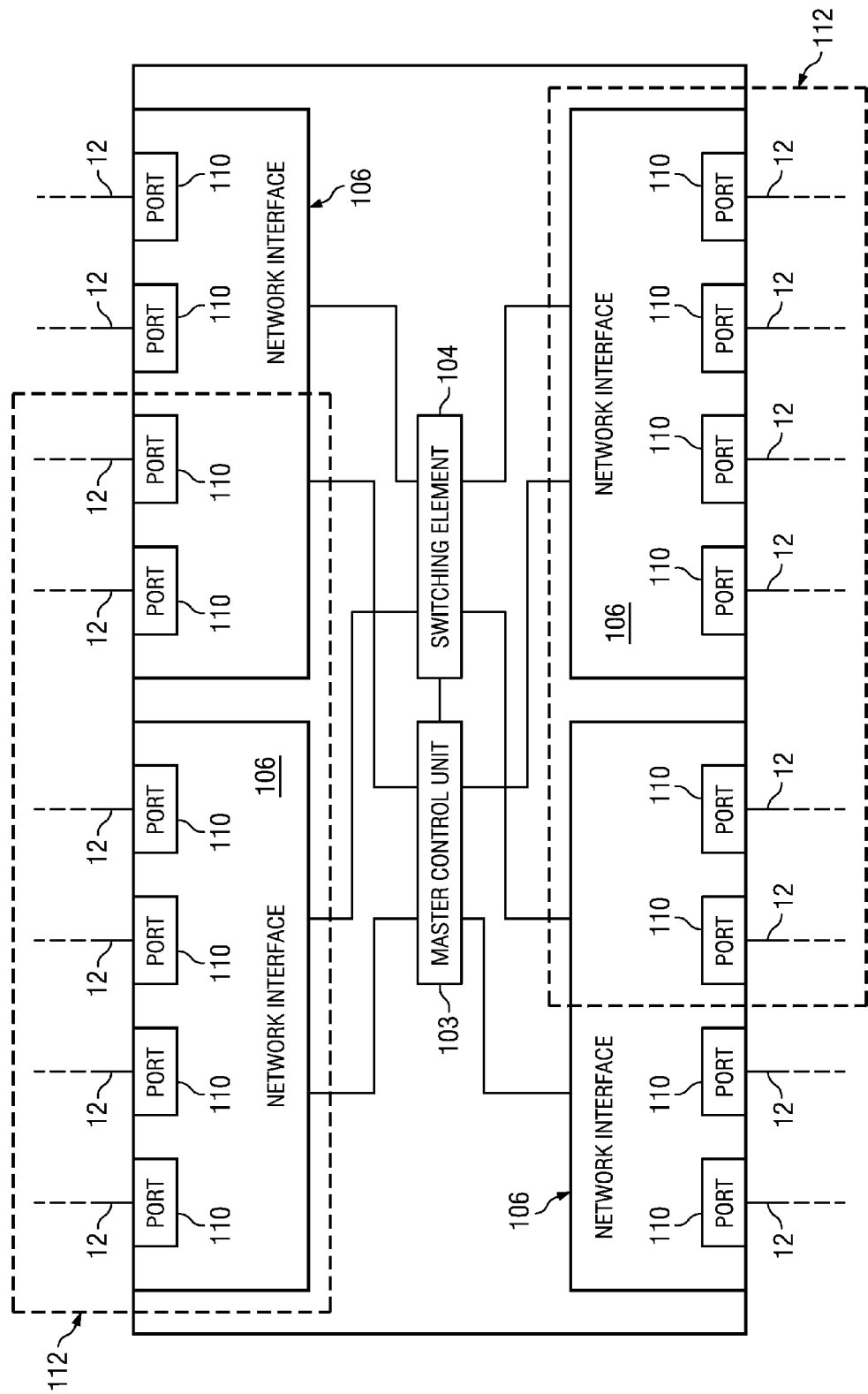
FIG. 2 illustrates a block diagram an example network element, in accordance with certain embodiments of the present disclosure.

FIG. 2 illustrates a block diagram an example network element 102, in accordance with certain embodiments of the present disclosure. Network element 102 of FIG. 2 may be exemplary of the various network elements discussed elsewhere in this disclosure (e.g., network elements 102a-102p). Each network element 102 may be coupled to one or more other network elements 102 via one or more transmission media 12. Each network element 102 may generally be configured to receive data from and/or transmit data to one or more other network elements 102. In certain embodiments, network element 102 may comprise a switch configured to route data received by network element 102 to another device (e.g., another network element 102) coupled to network element 102.

As depicted in FIG. 2, each network element 102 may include a master control unit 103, a switching element 104, and one or more network interfaces 106 communicatively coupled to each of master control unit 103 and switching element 104.

Master control unit 103 may include any suitable system, apparatus, or device configured to manage network element 102, including management of routing of data between ports 110. As shown in FIG. 2, master control unit 103 may maintain a routing table, wherein such routing table may include any table, database, file, or other data structure configured to maintain information relating a particular ingress port 110 and/or link aggregation group (LAG) 112 to a corresponding egress port 110 and/or LAG 112.

Switching element 104 may be communicatively coupled to master control unit 103 and may include any suitable system, apparatus, or device configured to receive traffic via a port 110 and route such traffic to a particular network interface 106 and/or port 110 based on analyzing the contents of the data and/or based on a characteristic of a signal carrying the data (e.g., a wavelength and/or modulation of the signal). For example, in certain embodiments, a switching element 104 may include a switch fabric (SWF).

Each network interface 106 may include any suitable system, apparatus, or device configured to serve as an interface between a network element 102 and a transmission medium 12. Each network interface 106 may enable its associated network element 102 to communicate to other network elements 102 using any suitable transmission protocol and/or standard. Network interface 106 and its various components may be implemented using hardware, software, or any combination thereof. For example, in certain embodiments, one or more network interfaces 106 may include a network interface card. In the same or alternative embodiments, one or more network interfaces 106 may include a line card.

As depicted in FIG. 2, each of network interfaces 106 may include one or more physical ports 110. Each physical port 110 may include any system, device or apparatus configured to serve as a physical interface between a corresponding transmission medium 12 and network interface 106. For example, a physical port may comprise an Ethernet port, an optical port, or any other suitable port.

As shown in FIG. 2, two or more physical ports 110 of a particular network element 102, their corresponding physical ports 110 of another network element 102, and their corresponding transmission media 12 may be grouped into a link aggregation group (LAG) 112. Although each LAG 112 in FIG. 2 is depicted as including a particular number of member physical ports 110, LAG 112 may include any suitable number of member physical ports 110. LAG 112 may combine its member ports or member LAGs using link aggregation such that the member ports are represented as a single logical port to components of a network 100 (e.g., a network 100a-100e) external to LAG 112. Although each LAG 112 in FIG. 2 is depicted as including only ports 110 of a single network element 102, a LAG 112 may in some embodiments include ports 110 of two or more network elements 102 (e.g., multi-chassis link aggregation).

Figure 3:
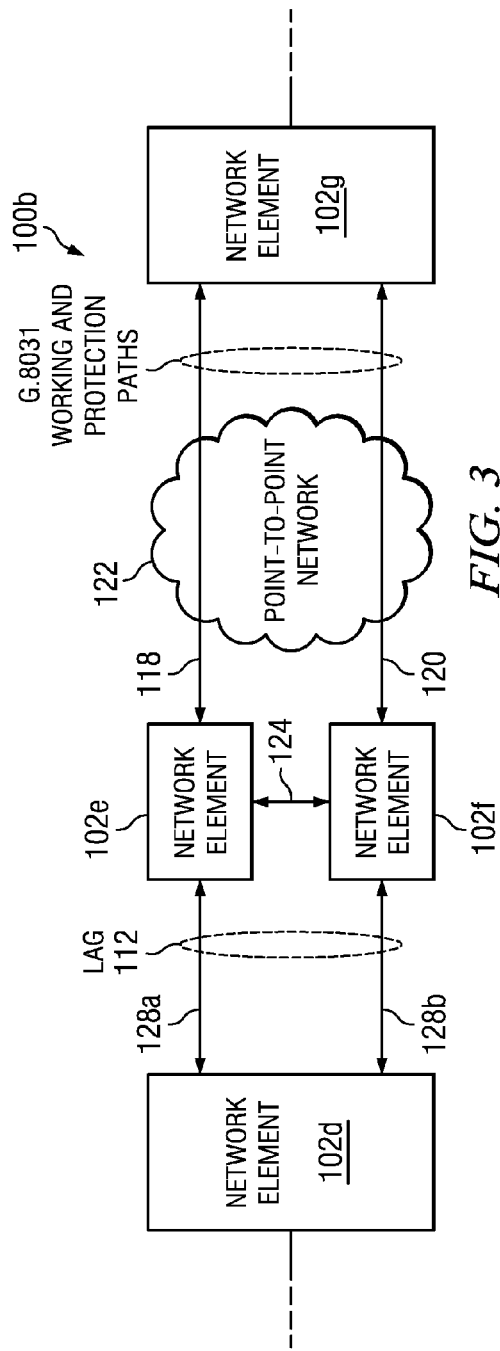
FIG. 3 illustrates a block diagram of an example network including protection switching among multiple network elements, wherein such multiple network elements are interfaced to a single link aggregation group, in accordance with certain embodiments of the present disclosure.

FIG. 3 illustrates a block diagram of an example network 100b including protection switching among multiple network elements (e.g., network elements 102e and 102f), wherein such multiple network elements are interfaced to a single multi-chassis link aggregation group (e.g., LAG 112), in accordance with certain embodiments of the present disclosure. As shown in FIG. 3, network 100b may include network element 102d communicatively coupled to network element 102e and network element 102f via a multi-chassis LAG 112, and network element 102g communicatively coupled to network element 102e and network element 102f via point-to-point network 122.

As described above, each of network elements 102d-102g may comprise any suitable system operable to transmit and receive traffic. Point-to-point network 122 may be any network of one or more network elements (e.g., routers and switches) suitable to provide one or more point-to-point paths between network element 102e and network element 102g, and between network element 102f and network element 102g. Point-to-point network 122 depicted in FIG. 3 may be similar to point-to-point network 122 depicted in FIG. 1.

Network element 102d may be multi-homed via LAG 112 to network elements 102e and 102f such that network elements 102e and 102f appear as a single network element to network element 102d.

Network element 102g may communicate with network elements 102e and 102f using linear protected switching. Accordingly, network element 102g may be communicatively coupled to network elements 102e and 102f through a linearly protected switching connection. The linearly protected switching connection may comprise a working path 118 and a protection path 120 and may be similar to the linearly protected switching connection described above with respect to FIG. 1. Network element 102g may be configured to perform linear protected switching between working path 118 and protection path 120. For example, network element 102g may be configured to perform protection switching between paths 118 and 120 in accordance with the G.8031 standard and may thus maintain a G.8031 state machine for maintaining state information and switchover information for protection switching.

In addition, network elements 102e and 102f may be configured to implement protection switching between working path 118 and protection path 120. For example, network elements 102e and 102f may be configured to perform protection switching between paths 118 and 120 in accordance with a modified multi-chassis version of the G.8031 standard and each may thus maintain a G.8031 state machine for maintaining state information and switchover information for protection switching. In addition, network elements 102e and 102f may be communicatively coupled via a synchronization connection 124. Via synchronization connection 124, network elements 102e and 102f may communicate to each other such state information and switchover information. Synchronization connection 124 depicted in FIG. 3 may be similar to synchronization connection 124 depicted in FIG. 1.

In operation, paths 118 and 120 may provide connectivity for services between network element 102g and network elements 102e and 102f (and ultimately, connectivity for services between network elements 102d and 102g). For a particular service, one of paths 118, 120 may be designated as active, such that traffic for such service is communicated over such active path. In the event of a failure or other event, one or more of network elements 102e, 102f, and 102g may cause a protection switch of the service from the active path to the other path (e.g., from working path 118 to protection path 120). In certain embodiments, such protection switching may be implemented in accordance with the G.8031 standard.

Similarly, for a particular service, one of member links 128a and 128b of LAG 112 may be designated as active and the other as standby, such that traffic for such service is communicated over such active link. In the event of a failure or other event, one or more of network elements 102d, 102e, and 102f may cause traffic associated from the service to be switched from the active link to the standby link (e.g., from link 128a to link 128b).

In addition, during operation paths 118 and 120 and links 128 may be configured in accordance with any suitable redundancy scheme. For example, a 1+1 protection scheme may be used in which traffic is replicated among paths 118 and 120 and links 128 and an end point network element may determine which path/link combination to select. As another example, a 1:1 scheme may be used in which all traffic is communicated over a single path/link combination (e.g., working path 118 and link 128a) and is protection switched to the other (e.g., protection path 120 and link 128b) in response to an event.

Protection switching from one path/link combination to another may occur in response to any suitable event. For example, failure of either of a path 118, 120 or a link 128 in a path/link combination may cause a switchover to the other path/link combination (e.g., a failure in either of path 118 or link 128a may cause switchover to the combination of path 120 and link 128b). As an additional example, a switchover may occur automatically after a failure condition has been remedied (e.g., a wait to restore timer initiated after a failure on working path 118 may trigger a switchover from protection path 120 to working path 118, and a switchover from link 128b to link 128a). As a further example, a switchover may occur in response to a human-initiated action (e.g., a command to switchover issued by a network operator/administrator). All such events may be monitored by network elements 102e and 102f and all such monitoring may be synchronized between network elements 102e and 102f via synchronization connection 124. In addition, switchovers may be initiated by network element 102e and/or network element 102f in response to such monitored events, and such initiation of such switchovers may also be synchronized between network elements 102e and 102f via synchronization connection 124.

A technical advantage of network 100b is that it provides for network element-level redundancy for point-to-point Ethernet virtual channels across a network that is interoperable with multi-chassis link aggregation.

FIG. 4 illustrates a block diagram of an example network 100c including protection switching among multiple network elements 102i and 102j interfaced between point-to-point network domains 122a and 122b, in accordance with certain embodiments of the present disclosure. As shown in FIG. 4, network 100c may include network element 102h communicatively coupled to network element 102i and network element 102j via point-to-point network 122a, and network element 102k communicatively coupled to network element 102i and network element 102j via point-to-point network 122b.

As described above, each of network elements 102h-102k may comprise any suitable system operable to transmit and receive traffic. Point-to-point network 122a may be any network of one or more network elements (e.g., routers and switches) suitable to provide one or more point-to-point paths between network element 102h and network element 102i, and between network element 102h and network element 102j. Point-to-point network 122b may be any network of one or more network elements (e.g., routers and switches) suitable to provide one or more point-to-point paths between network element 102k and network element 102i, and between network element 102k and network element 102j. Point-to-point networks 122a and 122b depicted in FIG. 4 may be similar to point-to-point networks 122 depicted in FIGS. 1 and 3.

Network element 102h may be multi-homed such that network elements 102i and 102j appear as a single network element to network element 102h.

Network element 102h may communicate with network elements 102i and 102j using linear protected switching. Accordingly, network element 102h may be communicatively coupled to network elements 102i and 102j through a linearly protected switching connection. The linearly protected switching connection may comprise a working path 118a and a protection path 120a and may be similar to the linearly protected switching connections described above with respect to FIGS. 1 and 3. Network element 102h may be configured to perform linear protected switching between working path 118a and protection path 120a. For example, network element 102h may be configured to perform protection switching between paths 118a and 120a in accordance with the G.8031 standard and may thus maintain a G.8031 state machine for maintaining state information and switchover information for protection switching.

Furthermore, network element 102k may communicate with network elements 102i and 102j using linear protected switching. Accordingly, network element 102k may be communicatively coupled to network elements 102i and 102j through a linearly protected switching connection. The linearly protected switching connection may comprise a working path 118b and a protection path 120b and may be similar to the linearly protected switching connections described above with respect to FIGS. 1 and 3. Network element 102k may be configured to perform linear protected switching between working path 118b and protection path 120b. For example, network element 102k may be configured to perform protection switching between paths 118b and 120b in accordance with the G.8031 standard and may thus maintain a G.8031 state machine for maintaining state information and switchover information for protection switching.

In addition, network elements 102i and 102j may be configured to implement protection switching between working path 118a and protection path 120a and protection switching between working path 118b and protection path 120b. For example, network elements 102i and 102j may be configured to perform protection switching between paths 118a and 120a and between paths 118b and 120b in accordance with a modified multi-chassis version of the G.8031 standard and each may thus maintain a G.8031 state machine for maintaining state information and switchover information for protection switching. In addition, network elements 102i and 102j may be communicatively coupled via a synchronization connection 124. Via synchronization connection 124, network elements 102i and 102j may communicate to each other such state information and switchover information. Synchronization connection 124 depicted in FIG. 4 may be similar to synchronization connections 124 depicted in FIGS. 1 and 3.

In operation, paths 118a and 120a may provide connectivity for services between network element 102h and network elements 102i and 102j (and ultimately, connectivity for services between network elements 102h and 102k). For a particular service, one of paths 118a, 120a may be designated as active, such that traffic for such service is communicated over such active path. In the event of a failure or other event, one or more of network elements 102h, 102i, and 102j may cause a protection switch of the service from the active path to the other path (e.g., from working path 118a to protection path 120a). In certain embodiments, such protection switching may be implemented in accordance with the G.8031 standard.

Similarly, paths 118b and 120b may provide connectivity for services between network element 102k and network elements 102i and 102j (and ultimately, connectivity for services between network elements 102h and 102k). For a particular service, one of paths 118b, 120b may be designated as active, such that traffic for such service is communicated over such active path. In the event of a failure or other event, one or more of network elements 102k, 102i, and 102j may cause a protection switch of the service from the active path to the other path (e.g., from working path 118b to protection path 120b). In certain embodiments, such protection switching may be implemented in accordance with the G.8031 standard.

In addition, during operation paths 118a, 118b, 120a and 120b may be configured in accordance with any suitable redundancy scheme. For example, a 1+1 protection scheme may be used in which traffic is replicated among paths 118 and 120a, and an end point network element may determine which paths to select. As another example, a 1:1 scheme may be used in which all traffic is communicated over a single pair of paths (e.g., working paths 118a and 118b) and is protection switched to the other pair of paths (e.g., protection paths 120a and 120b) in response to an event.

Protection switching from one pair of paths to another may occur in response to any suitable event. For example, failure of any path 118a, 118b, 120a, or 120b may cause a switchover in both point-to-point networks 122a and 122b (e.g., a failure in either of path 118a or path 118b may cause switchover to path 120a and 120b). As an additional example, a switchover may occur automatically after a failure condition has been remedied (e.g., a wait to restore timer initiated after a failure on working path 118a or 118b may trigger a switchover from protection path 120b to working path 118b, and a switchover from protection path 120a to working path 118a). As a further example, a switchover may occur in response to a human-initiated action (e.g., a command to switchover issued by a network operator/administrator). All such events may be monitored by network elements 102i and 102j and all such monitoring may be synchronized between network elements 102i and 102j via synchronization connection 124. In addition, switchovers may be initiated by network element 102i and/or network element 102j in response to such monitored events, and such initiation of such switchovers may also be synchronized between network elements 102i and 102j via synchronization connection 124.

A technical advantage of network 100c is that it provides a redundant solution to two L2 network domains that provide point-to-point L2 services.

FIG. 5 illustrates a block diagram of another example network 100d including protection switching among multiple network elements (e.g., network elements 102m and 102n) interfaced between point-to-point network domains, in accordance with certain embodiments of the present disclosure. As shown in FIG. 5, network 100d may include network element 102l communicatively coupled to network element 102m and network element 102n via point-to-point network 122c, and network elements 102o and 102p communicatively coupled to network element 102m and network element 102n via point-to-point network 122d.

As described above, each of network elements 102l-102p may comprise any suitable system operable to transmit and receive traffic. Point-to-point network 122c may be any network of one or more network elements (e.g., routers and switches) suitable to provide one or more point-to-point paths between network element 102l and network element 102m, and between network element 102l and network element 102n. Point-to-point network 122b may be any network of one or more network elements (e.g., routers and switches) suitable to provide one or more point-to-point paths between network element 102m and network element 102o, between network element 102m and network element 102p, between network element 102*n* and network element 102*o*, and between network element 102*n* and network element 102*p*. Point-to-point network 122*c* and 122*d* depicted in FIG. 5 may be similar to point-to-point networks 122 depicted in FIGS. 1 and 3 and/or point-to-point networks 122*a* and/or 112*b* depicted in FIG. 4.

Network element 102*l* may be multi-homed such that network elements 102*m* and 102*n* appear as a single network element to network element 102*l*. Network elements 102*m* and 102*n* may be multi-homed such that network elements 102*o* and 102*p* appear as a single network element to each of network elements 102*m* and 102*n*. Network elements 102*o* and 102*p* may be multi-homed such that network elements 102*m* and 102*n* appear as a single network element to each of network elements 102*o* and 102*p*.

Network element 102*l* may communicate with network elements 102*m* and 102*n* using linear protected switching. Accordingly, network element 102*l* may be communicatively coupled to network elements 102*m* and 102*n* through a linearly protected switching connection. The linearly protected switching connection may comprise a working path 118*c* and a protection path 120*c* and may be similar to the linearly protected switching connections described above with respect to FIGS. 1, 3 and 4. Network element 102*l* may be configured to perform linear protected switching between working path 118*c* and protection path 120*c*. For example, network element 102*l* may be configured to perform protection switching between paths 118*c* and 120*c* in accordance with the G.8031 standard and may thus maintain a G.8031 state machine for maintaining state information and switchover information for protection switching.

Furthermore, network element 102*m* may communicate with network elements 102*o* and 102*p* using linear protected switching. Accordingly, network element 102*m* may be communicatively coupled to network elements 102*o* and 102*p* through a linearly protected switching connection. The linearly protected switching connection may comprise a working path 118*d* and a protection path 120*d* and may be similar to the linearly protected switching connections described above with respect to FIGS. 1, 3 and 4. Network element 102*m* may be configured to perform linear protected switching between working path 118*d* and protection path 120*d*. For example, network element 102*m* may be configured to perform protection switching between paths 118*d* and 120*d* in accordance with the G.8031 standard and may thus maintain a G.8031 state machine for maintaining state information and switchover information for protection switching.

In addition, network element 102*n* may communicate with network elements 102*o* and 102*p* using linear protected switching. Accordingly, network element 102*n* may be communicatively coupled to network elements 102*o* and 102*p* through a linearly protected switching connection. The linearly protected switching connection may comprise a working path 118*e* and a protection path 120*e* and may be similar to the linearly protected switching connections described above with respect to FIGS. 1, 3 and 4. Network element 102*n* may be configured to perform linear protected switching between working path 118*e* and protection path 120*e*. For example, network element 102*n* may be configured to perform protection switching between paths 118*e* and 120*e* in accordance with the G.8031 standard and may thus maintain a G.8031 state machine for maintaining state information and switchover information for protection switching.

In addition, network elements 102*m* and 102*n* may be configured to implement protection switching between working path 118*c* and protection path 120*c*. For example, network elements 102*m* and 102*n* may be configured to perform protection switching between paths 118*c* and 120*c* in accordance with a modified multi-chassis version of the G.8031 standard and each may thus maintain a G.8031 state machine for maintaining state information and switchover information for protection switching. In addition, network elements 102*m* and 102*n* may be communicatively coupled via a synchronization connection 124*a*. Via synchronization connection 124*a*, network elements 102*m* and 102*n* may communicate to each other such state information and switchover information. Synchronization connection 124*a* depicted in FIG. 5 may be similar to synchronization connections 124 depicted in FIGS. 1, 3 and 4.

Similarly, network elements 102*o* and 102*p* may be configured to implement protection switching between working path 118*d* and protection path 120*d* and protection switching between working path 118*e* and protection path 120*e*. For example, network elements 102*o* and 102*p* may be configured to perform protection switching between paths 118*d* and 120*d* and between paths 118*e* and 120*e* in accordance with a modified multi-chassis version of the G.8031 standard and each may thus maintain a G.8031 state machine for maintaining state information and switchover information for protection switching. In addition, network elements 102*o* and 102*p* may be communicatively coupled via a synchronization connection 124*b*. Via synchronization connection 124*b*, network elements 102*o* and 102*p* may communicate to each other such state information and switchover information. Synchronization connection 124*b* depicted in FIG. 5 may be similar to synchronization connection 124*a* and/or synchronization connections 124 depicted in FIGS. 1, 3 and 4.

In operation, paths 118*c* and 120*c* may provide connectivity for services between network element 102*l* and network elements 102*m* and 102*n* (and ultimately, connectivity for services between network elements 102*l* and 102*o* and between network elements 102*l* and 102*p*). For a particular service, one of paths 118*c*, 120*c* may be designated as active, such that traffic for such service is communicated over such active path. In the event of a failure or other event, one or more of network elements 102*l*, 102*m*, and 102*n* may cause a protection switch of the service from the active path to the other path (e.g., from working path 118*c* to protection path 120*c*). In certain embodiments, such protection switching may be implemented in accordance with the G.8031 standard.

Similarly, paths 118*d* and 120*d* may provide connectivity for services between network element 102*m* and network elements 102*o* and 102*p* (and ultimately, connectivity for services between network elements 102*l* and 102*o* and between network elements 102*l* and 102*p*). For a particular service, one of paths 118*d*, 120*d* may be designated as active, such that traffic for such service is communicated over such active path. In the event of a failure or other event, one or more of network elements 102*m*, 102*o*, and 102*p* may cause a protection switch of the service from the active path to the other path (e.g., from working path 118*d* to protection path 120*d*). In certain embodiments, such protection switching may be implemented in accordance with the G.8031 standard.

Moreover, paths 118*e* and 120*e* may provide connectivity for services between network element 102*n* and network elements 102*o* and 102*p* (and ultimately, connectivity for services between network elements 102*l* and 102*o* and between network elements 102*l* and 102*p*). For a particular service, one of paths 118*e*, 120*e* may be designated as active, such that traffic for such service is communicated over such active path. In the event of a failure or other event, one or more of network elements 102*n*, 102*o*, and 102*p* may cause a protection switch of the service from the active path to the other path (e.g., from working path 118*e* to protection path 120e). In certain embodiments, such protection switching may be implemented in accordance with the G.8031 standard.

In addition, during operation, each set of paths 118c and 120c, 118d and 120d, and 118e and 120e, may be configured in accordance with any suitable redundancy scheme. For example, a 1+1 protection scheme may be used in which traffic is replicated among paths making up a linearly protected switching connection, and an end point network element may determine which paths to select. As another example, a 1:1 scheme may be used in which all traffic is communicated over one path of a linearly protected switching connection and is protection switched to the other path of the linearly protected switching connection in response to an event.

Protection switching from one path to another may occur in response to any suitable event. For example, failure of any path of in a linearly protected switching connection may cause a switchover to the other path of the linearly protected switching connection (e.g., a failure in path 118c may cause switchover to path 120c, a failure in path 118d may cause switchover to path 120d, and a failure in path 118e may cause switchover to path 120e). Advantageously, in network 100d a failure in one path may cause a switchover only in the linear protected switching connection including such path without leading to switchover of other linear protected switching connections, thus minimizing disruption. For example, a failure of path 118d causing a switchover to path 120d may have no effect on the protection switching status of paths 118c and 120c. In addition, a failure of path 118c causing a switchover to path 120c may cause traffic to be switched from the linear protected switching connection including paths 118d and 120d to the linear protected switching connection including paths 118e and 120e, but may have no effect on the protection switching statuses of the linear protected switching connection including paths 118d, 120d, 118e, and 120e.

As an additional example, a switchover may occur automatically after a failure condition has been remedied (e.g., a wait to restore timer initiated after a failure on working path 118c may trigger a switchover from protection path 120c to working path 118c). As a further example, a switchover may occur in response to a human-initiated action (e.g., a command to switchover issued by a network operator/administrator).

All such events for the linear protected switching connection including paths 118c and 120c may be monitored by network elements 102m and 102n and all such monitoring may be synchronized between network elements 102m and 102n via synchronization connection 124a. In addition, switchovers for the linear protected switching connection including paths 118c and 120c may be initiated by network element 102m and/or network element 102n in response to such monitored events, and such initiation of such switchovers may also be synchronized between network elements 102m and 102n via synchronization connection 124a.

All such events for the linear protected switching connection including paths 118d and 120d and the linear protecting switching connection including paths 118e and 120e may be monitored by network elements 102o and 102p and all such monitoring may be synchronized between network elements 102o and 102p via synchronization connection 124b. In addition, switchovers for the linear protected switching connection including paths 118d and 120d and the linear protected switching connection including paths 118e and 120e may be initiated by network element 102o and/or network element 102p in response to such monitored events, and such initiation of such switchovers may also be synchronized between network elements 102o and 102p via synchronization connection 124b.

A technical advantage of network 100d is that it provides a redundant solution to two L2 network domains that provide point-to-point L2 services using multiple levels of redundancy.

Figure 6:
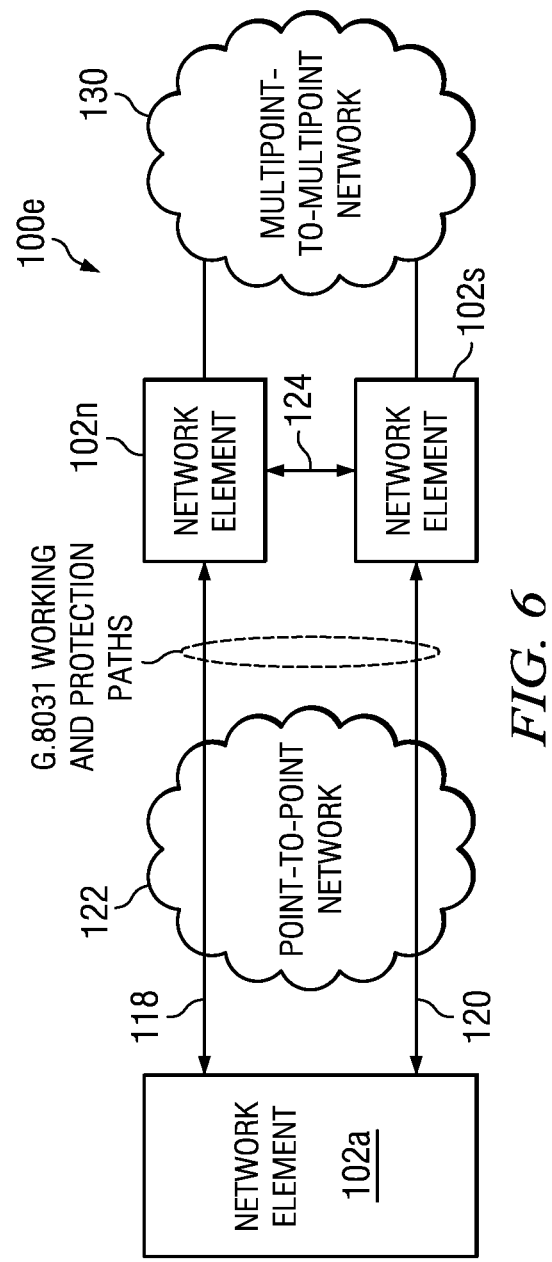
FIG. 6 illustrates a block diagram of an example network including protection switching among multiple network elements interfaced between a point-to-point network and a multipoint-to-multipoint network, in accordance with certain embodiments of the present disclosure.

FIG. 6 illustrates a block diagram of an example network 110e including protection switching among multiple network elements (e.g., network elements 102r and 102s) interfaced between a point-to-point network 122 and a multipoint-to-multipoint network 130, in accordance with certain embodiments of the present disclosure. As shown in FIG. 6, network 100d may include network element 102q communicatively coupled to network element 102r and network element 102s via point-to-point network 122, with network elements 102r and 102s communicatively coupled to multipoint-to-multipoint network 130.

As described above, each of network elements 102q-102s may comprise any suitable system operable to transmit and receive traffic. Point-to-point network 122 may be any network of one or more network elements (e.g., routers and switches) suitable to provide one or more point-to-point paths between network element 102q and network element 102r, and between network element 102q and network element 102s. Point-to-point network 122 depicted in FIG. 6 may be similar to point-to-point networks 122 depicted in FIGS. 1 and 3 and point-to-point networks 122a and 122b depicted in FIGS. 4 and 5.

Multipoint-to-multipoint network 130 may include a bridged network or similar network that uses flooding (e.g., broadcasting) and examination of source addresses in received packet headers to locate unknown devices in a network. Once a device has been located, its location may recorded in a table referenced by a unique address (e.g., Media Access Control (MAC) address) or the device so as to preclude the need for further broadcasting.

Network element 102q may be multi-homed such that network elements 102r and 102s appear as a single network element to network element 102q.

Network element 102q may communicate with network elements 102r and 102s using linear protected switching. Accordingly, network element 102q may be communicatively coupled to network elements 102r and 102s through a linearly protected switching connection. The linearly protected switching connection may comprise a working path 118 and a protection path 120 and may be similar to the linearly protected switching connections described above with respect to FIGS. 1, 3, 4, and 5. Network element 102q may be configured to perform linear protected switching between working path 118 and protection path 120. For example, network element 102q may be configured to perform protection switching between paths 118 and 120 in accordance with the G.8031 standard and may thus maintain a G.8031 state machine for maintaining state information and switchover information for protection switching.

In addition, network elements 102r and 102s may be configured to implement protection switching between working path 118 and protection path 120. For example, network elements 102r and 102s may be configured to perform protection switching between paths 118 and 120 in accordance with a modified multi-chassis version of the G.8031 standard and each may thus maintain a G.8031 state machine for maintaining state information and switchover information for protection switching. In addition, network elements 102r and 102s may be communicatively coupled via a synchronization connection 124. Via synchronization connection 124, network elements 102r and 102s may communicate to each other such state information and switchover information. Synchronization connection 124 depicted in FIG. 6 may be similar to synchronization connections 124 depicted in FIGS. 1, 3 and 4 and synchronizations connections 124a and 124b depicted in FIG. 5.

In operation, paths 118 and 120 may provide connectivity for services between network element 102q and network elements 102r and 102s (and ultimately, connectivity for services between network element 102q and multipoint-to-multipoint network 130). For a particular service, one of paths 118, 120 may be designated as active, such that traffic for such service is communicated over such active path. In the event of a failure or other event, one or more of network elements 102q, 102r, and 102s may cause a protection switch of the service from the active path to the other path (e.g., from working path 118 to protection path 120). In certain embodiments, such protection switching may be implemented in accordance with the G.8031 standard.

In addition, during operation paths 118 and 120 may be configured in accordance with any suitable redundancy scheme. For example, a 1+1 protection scheme may be used in which traffic is replicated among paths 118 and 120 and an end point network element may determine which path to select. As another example, a 1:1 scheme may be used in which all traffic is communicated over a single path (e.g., working path 118) and is protection switched to the other path (e.g., protection path 120) in response to an event.

Protection switching from one path to another may occur in response to any suitable event. For example, failure of path 118 may cause a switchover in to path 120. As an additional example, a switchover may occur automatically after a failure condition has been remedied (e.g., a wait to restore timer initiated after a failure on working path 118 may trigger a switchover from protection path 120 to working path 118). As a further example, a switchover may occur in response to a human-initiated action (e.g., a command to switchover issued by a network operator/administrator). All such events may be monitored by network elements 102r and 102s and all such monitoring may be synchronized between network elements 102r and 102s via synchronization connection 124. In addition, switchovers may be initiated by network element 102r and/or network element 102s in response to such monitored events, and such initiation of such switchovers may also be synchronized between network elements 102r and 102s via synchronization connection 124.

To support multipoint-to-multipoint technologies (e.g., bridging) in multipoint-to-multipoint network 130, network elements 102r and 102s may be configured to record unique addresses (e.g., MAC addresses) and locations of devices of multipoint-to-multipoint network 130. In addition, the record of unique addresses and locations of devices may be synchronized between network elements 102r and 102s via synchronization connection 124, so as to aid in re-convergence of multipoint-to-multipoint network 130 after switchover from one path 118, 120 to the other.

A technical advantage of network 100e is that it provides a redundant solution to two L2 network domains (a point-to-point network and a multipoint-to-multipoint network) that provide L2 services.

A component of a network 100 (e.g., a network 100a-100e) may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component. Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to networks 100 without departing from the scope of the invention. The components of networks 100 may be integrated or separated. Moreover, the operations of networks 100 may be performed by more, fewer, or other components. Additionally, operations of networks 100 may be performed using any suitable logic. As used in this document, "each" refers to each member of a set or each member of a subset of a set.

Certain embodiments of the invention may provide one or more technical advantages. A technical advantage of one embodiment may be that alarm indication signals that typically originate from maintenance end points may be transmitted in the event that equipment upon which the maintenance end points have experienced a fault, thus reducing the occurrence of unnecessary alarms.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method comprising:
communicatively coupling a first network element to a second network element via a first path of a first point-to-point network;
communicatively coupling the first network element to a third network element via a second path of the first-point-to-point network;
communicatively coupling the second network element to a fourth network element via a first path of a second point-to-point network;
communicatively coupling the third network element to the fourth network element via a second path of the second point-to-point network, wherein each of the first, second, third and fourth network elements comprises a plurality of network interfaces and a switching element coupling the plurality of network interfaces; and
configuring the first path and the second path of the first point-to-point network as paths of a first linear protected switching connection and the first path and the second path of the second point-to-point network as paths of a second linear protected switching connection such that traffic associated with a service and communicated between the first network element and the fourth network element via the first path of the first point-to-point network and the first path of the second point-to-point network may be switched over to the second path of the first point-to-point network and the second path of the second point-to-point network in response to an event.

2. The method according to claim 1, further comprising configuring the second network element, the third network element, and the fourth network element such that the second network element and the third network element appear as a single network element to the fourth network element.

3. The method according to claim 1, further comprising configuring the first network element, the second network element, and the third network element such that the second network element and the third network element appear as a single network element to the first network element.

4. The method according to claim 1, wherein at least one of:
the first linear protected switching connection is configured in accordance with the ITU G.8031 standard with respect to the first network element; and
the second linear protected switching connection is configured in accordance with the ITU G.8031 standard with respect to the fourth network element.

5. The method according to claim 1, further comprising:
communicatively coupling the second network element and the third network element via a synchronization connection; and
configuring the second network element and the third network element to synchronize status information for the first linear protected switching connection and the second linear protected switching connection between the second network element and the third network element via the synchronization connection.

6. The method according to claim 1, wherein the event comprises one of:
a failure of the first path of the first point-to-point network;
a failure of the second path of the first point-to-point network;
a failure of the first path of second first point-to-point network;
a failure of the second path of second first point-to-point network;
a removal of a failure condition; and
a human-initiated command to switchover.

7. The method according to claim 1, further comprising configuring at least one of the first linear protected switching connection and the second linear protected switching connection for 1+1 redundancy protection.

8. The method according to claim 1, further comprising configuring at least one of the first linear protected switching connection and the second linear protected switching connection for 1:1 redundancy protection.

9. A method comprising:
communicatively coupling a first network element to a second network element via a first path of a first point-to-point network;
communicatively coupling the first network element to a third network element via a second path of the first-point-to-point network;
communicatively coupling the second network element to a fourth network element via a first path of a second point-to-point network;
communicatively coupling the second network element to a fifth network element via a second path of a second point-to-point network;
communicatively coupling the third network element to a fourth network element via a third path of a second point-to-point network;
communicatively coupling the third network element to a fifth network element via a fourth path of a second point-to-point network;
configuring the first path and the second path of the first point-to-point network as paths of a first linear protected switching connection, the first path and the second path of the second point-to-point network as paths of a second linear protected switching connection, and the third path and the fourth path of the second point-to-point network as paths of a third linear protected switching connection, such that traffic associated with a service and communicated between the first network element and the fourth network element via the first path of the first point-to-point network and the second linear protected switching connection may be switched over to the second path of the first point-to-point network and the third linear protected switching connection in response to an event.

10. The method according to claim 9, further comprising configuring the first path and the second path of the second point-to-point network such that traffic associated with a service and communicated via one of the first path of the second point-to-point network and the second path of the second point-to-point network may be switched over to the other of the first path of the second point-to-point network and the second path of the second point-to-point network in response to a second event.

11. The method according to claim 9, further comprising configuring the third path and the fourth path of the second point-to-point network such that traffic associated with a service and communicated via one of the third path of the second point-to-point network and the fourth path of the second point-to-point network may be switched over to the other of the third path of the second point-to-point network and the fourth path of the second point-to-point network in response to a second event.

12. The method according to claim 9, wherein at least one of:
the first linear protected switching connection is configured in accordance with the ITU G.8031 standard with respect to the first network element;
the second linear protected switching connection is configured in accordance with the ITU G.8031 standard with respect to the second network element; and
the third linear protected switching connection is configured in accordance with the ITU G.8031 standard with respect to the third network element.

13. The method according to claim 9, further comprising:
communicatively coupling the second network element and the third network element via a synchronization connection; and
configuring the second network element and the third network element to synchronize status information for the first linear protected switching connection via the synchronization connection.

14. The method according to claim 13, further comprising configuring the second network element and the third network element to synchronize status information for the second linear protected switching connection and the third linear protected switching connection via the synchronization connection.

15. The method according to claim 9, further comprising:
communicatively coupling the fourth network element and the fifth network element via a synchronization connection; and
configuring the fourth network element and the fifth network element to synchronize status information for the second linear protected switching connection and third linear protected switching connection via the synchronization connection.

16. The method according to claim 9, wherein the event comprises one of:
   a failure of the first path of the first point-to-point network;
   a failure of the second path of the first point-to-point network;
   a removal of a failure condition; and
   a human-initiated command to switchover.

17. The method according to claim 9, further comprising configuring at least one of the first linear protected switching connection and the second linear protected switching connection for 1+1 redundancy protection.

18. The method according to claim 9, further comprising configuring at least one of the first linear protected switching connection and the second linear protected switching connection for 1:1 redundancy protection.

19. A network element comprising:
   a processor; and
   one or more non-transitory computer readable media storing:
      logic for communicatively coupling the network element to a second network element via a first path of a first point-to-point network;
      logic for communicatively coupling the network element and to a third network element via a synchronization connection;
      logic for communicatively coupling the network element to a fourth network element via a first path of a second point-to-point network, wherein each of the network elements comprises a plurality of network interfaces and a switching element coupling the plurality of network interfaces;
      wherein:
         the second network element and the third network element are configured to be communicatively coupled via a second path of the first point-to-point network such that the first path and the second path of the first point-to-point network may be configured as paths of a first linear protected switching connection;
         the third network element and the fourth network element are configured to be communicatively coupled via a second path of the second point-to-point network such that the first path and the second path of the second point-to-point network may be configured as paths of a second linear protected switching connection; and
         traffic associated with a service and communicated between the second network element and the fourth network element via the first path of the first point-to-point network and the first path of the second point-to-point network may be switched over to the second path of the first point-to-point network and the second path of the second point-to-point network in response to an event; and
      logic for configuring the network element and the third network element to synchronize status information for the first linear protected switching connection and the second linear protected switching connection between the network element and the third network element via the synchronization connection.

20. A network element comprising:
   a processor; and
   one or more non-transitory computer readable media storing:
      logic for communicatively coupling the network element to a second network element via a first path of a first point-to-point network;
      logic for communicatively coupling the network element and to a third network element via a synchronization connection;
      logic for communicatively coupling the network element to a fourth network element via a first path of the second point-to-point network;
      logic for communicatively coupling the network element to a fifth network element via a second path of a second point-to-point network such that the first path and the second path of the second point-to-point network may be configured as paths of a second linear protected switching connection;
      wherein:
         the second network element and the third network element are configured to be communicatively coupled via a second path of the first point-to-point network such that the first path and the second path of the first point-to-point network may be configured as paths of a first linear protected switching connection;
         the third network element and the fourth network element are configured to be communicatively coupled via a third path of the second point-to-point network;
         the third network element and the fifth network element are configured to be communicatively coupled via a fourth path of the second point-to-point network such that the third path and the fourth path of the second point-to-point network may be configured as paths of a third linear protected switching connection; and
         traffic associated with a service and communicated between the second network element and the fourth network element via the first path of the first point-to-point network and the second linear protected switching connection may be switched over to the second path of the first point-to-point network and the third linear protected switching connection in response to an event; and
      logic for configuring the network element and the third network element to synchronize status information for at least one of the first linear protected switching connection, the second linear protected switching connection, and the third linear protected switching connection via the synchronization connection.

* * * * *

UNITED STATES PATENT AND TRADEMARK OFFICE
CERTIFICATE OF CORRECTION

PATENT NO. : 8,547,828 B2  Page 1 of 1
APPLICATION NO. : 12/849311
DATED : October 1, 2013
INVENTOR(S) : Mandar Joshi et al.

It is certified that error appears in the above-identified patent and that said Letters Patent is hereby corrected as shown below:

On the title page: Item (75) Inventors:

After "Mandar Joshi," and before "CA (US);" delete "Santa Clara," and insert --San Jose,--.

Signed and Sealed this
Eleventh Day of November, 2014

Michelle K. Lee
*Deputy Director of the United States Patent and Trademark Office*